2 Sheets—Sheet 1.

J. MILTON.

LOCOMOTIVE BOILER FURNACE.

No. 11,370. Reissued Oct. 3, 1893.

Witnesses

Edwin L. Bradford

Curtis Hammond

John Milton

Inventor

By Wm. C. Fitzsimmons

Attorney

J. MILTON.

LOCOMOTIVE BOILER FURNACE.

No. 11,370. Reissued Oct. 3, 1893.

Witnesses
Edwin L. Bradford
Curtis Lammond

John Milton
inventor
By Wm. C. Rives
Attorney

UNITED STATES PATENT OFFICE.

JOHN MILTON, OF ALEXANDRIA, VIRGINIA, ASSIGNOR, BY DIRECT AND MESNE ASSIGNMENTS, TO THE MILTON SMOKE-BURNER COMPANY, OF VIRGINIA.

LOCOMOTIVE-BOILER FURNACE.

SPECIFICATION forming part of Reissued Letters Patent No. 11,370, dated October 3, 1893.

Original No. 503,155, dated August 15, 1893. Application for reissue filed August 29, 1893. Serial No. 484,328.

*To all whom it may concern:*

Be it known that I, JOHN MILTON, of Alexandria, in the county of Alexandria and State of Virginia, have invented a new and useful Improvement in Locomotive-Boiler Furnaces, of which the following is a specification.

My invention is in the nature of certain improvements upon the construction of boiler furnaces shown in several previous applications for patents made by me, in all of which, as the leading feature, air is introduced into the fire box through a system of perforated pipes disposed in inclined position as a partition just above the fire, and protected from injurious burning by subjacent water beds, or by jackets of refractory material.

My present invention comprises an improved means for protecting the air pipes without interfering with the access to the boiler tubes; and in an improved means for automatically supplying air under pressure to the air pipes both while the locomotive is in progress and standing still, all as hereinafter fully described.

Figure 1:
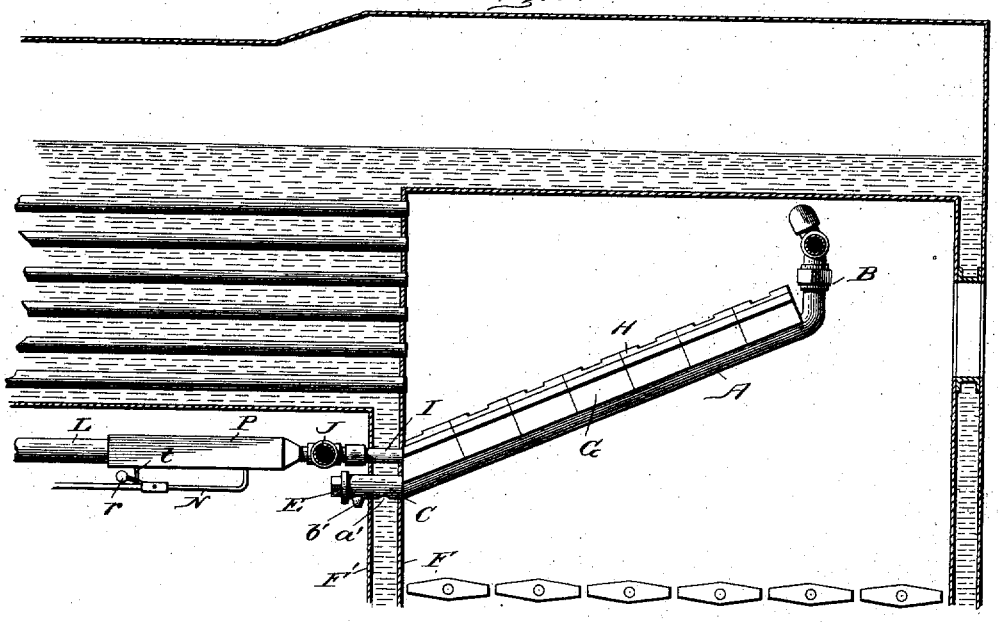
Figure 3:
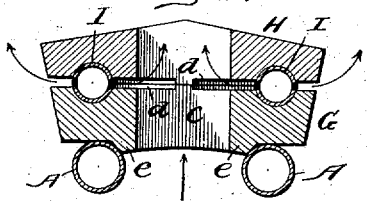
Figure 4:
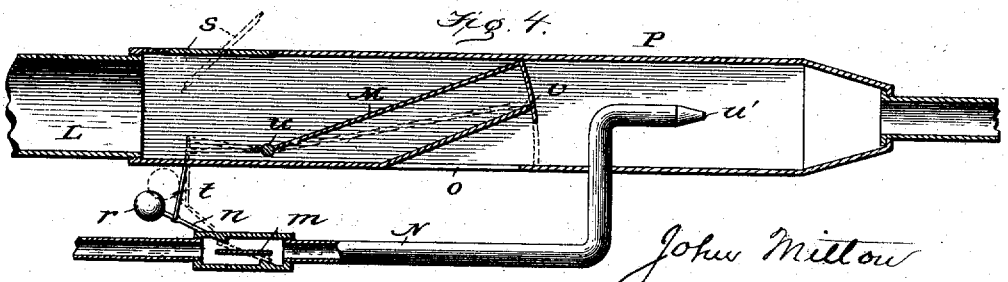
Figure 2:
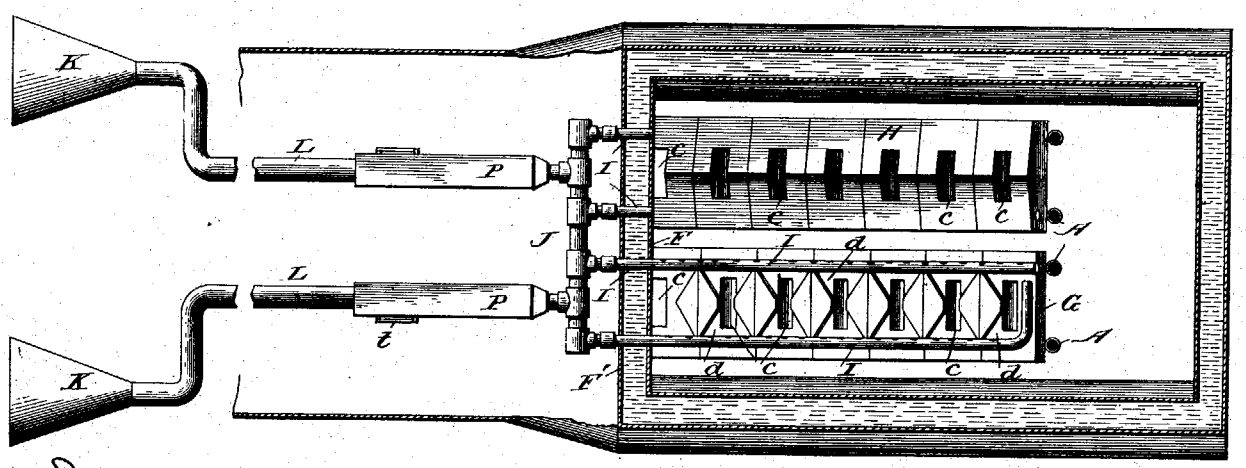

Figure 1 is a vertical longitudinal section of a locomotive boiler furnace. Fig. 2 is a horizontal section of the same through the fire box. Fig. 3 is a cross sectional detail of the fire brick protection for the air pipes. Fig. 4 is an enlarged sectional detail of the air feeding device.

In the drawings A represents a series of inclined water pipes disposed in the fire box just above the fire with their ends next to the door higher than the opposite ends. The higher ends of these pipes are connected together, and at B, Fig. 1, communicate with the water legs at the sides of the fire box, and at their lower ends communicate with the water leg at the back of the fire box through a blow off valve hereinafter described. These water pipes are intended to have a continuous circulation of water through them to keep them cool and prevent burning, and for the purpose also of increasing the generation of steam. These water pipes form a support for the air pipes I, which are housed between two layers of fire brick G and H. These two layers of brick have grooves formed in their adjacent faces to receive the perforated air pipes, each of which pipes has a row of perforations on each side. Both layers of fire brick have vertical openings *c* through them, up through which pass a portion of the fire currents, the balance and greater portion of the hot gases passing up between the rows and outside of the fire bricks. The air issuing from the air pipes passes up through the perforations upon one side, and commingle with and completely consume the smoke and gases arising between the rows of fire bricks and outside of the same, and upon the opposite or inner sides of the air pipes the air is directed into the gases arising through the openings *c*, and for this purpose the fire bricks have formed on their inner faces tapering depressions *d* that lead the air from the pipes into the openings *c*.

To facilitate dislodging ashes from the top of the fire bricks their upper sides are beveled each way from the middle line, and the lower layers of brick have shoulders *e e* that lie between the water pipes and prevent them from being displaced laterally. These bricks are simply laid upon the water pipe, and are conveniently and quickly detachable, so as to permit access to the tubes of the boiler for inspecting and repairing the same. These fire bricks are easily replaced in part or whole when broken or worn out, and they afford a protection to the air pipe against the intense heat within the fire box, and also serve to deflect the air in thin sheets through every part of the rising smoke and gases to perfectly consume the same.

The air tubes I which supply the fire box receive air through cross pipes J from pipes L terminating at their front ends in funnels conveniently placed in the front part of the locomotive and adapted to create a forced air feed by the movement of the locomotive. As the forced feed ceases when the locomotive stops, I provide special means for continuing the air blast in an automatic manner as follows: P is a box casing or an enlarged part of pipe L, having in its bottom an opening *o* and an upwardly bent lip *e* just in front of said opening. M is a valve adapted to the cross section of the casing P and having a lip *v* at its outer end that plays over the end of lip *e* and closes the opening *o* when valve M is down. This valve is fulcrumed at *u* and has a lever extension on the opposite side of its fulcrum that is connected by a link *t* with a lever arm *n* on the end of the axis of a butterfly valve *m* in a steam boiler pipe N. The steam pipe runs from the boiler and terminates in a nozzle within the casting P behind the valve M. The outer end of the lever arm *n* is provided with a counterweight *r* which slightly overbalances the weight of valve M and holds it shut and butterfly valve *m* open.

The action of these parts is as follows: When the locomotive is in motion the air driven in the funnels K forces down the valve M, throwing it wide open, closing with lip *v*, the orifice O, and lifting the arm *n*, and closing the steam valve. Air is now being supplied in a forced feed to the funnel by the movement of the locomotive. When the locomotive stops, the air pressure on valve M being removed, counterweight *r* drops down and closes valve M; opens air inlet O, and also opens the steam valve *m*. Steam now flows through nozzle W, and sucking air in at O, supplies a forced feed of air just so long as the locomotive is stationary. When the locomotive starts again, the impact of air on valve M opens it again, the steam supply is cut off, and air is fed by the mere passage of the locomotive again. In this way the device is made to work automatically, the forced air feed being continuously maintained in a perfectly automatic manner, no matter whether the locomotive is moving or stationary. In case there is too strong a draft in the pipe L, as might occur with a head wind, a relief valve *s*, or escape damper, may be provided to allow the escape of any desired portion of the blast.

As a modification of my invention, instead of using steam from pipe N, I may connect this pipe N to the air reservoir that supplies the brakes, and allow a blast of air to proceed directly therefrom without the induction of air by the steam jet.

It will be understood that although described as applicable to locomotive boiler furnaces, the several features of my invention are not limited thereto, but may be applied to marine or other forms of boilers.

Having thus described my invention, what I claim as new, and desire to secure by Letters Patent, is—

1. The water pipes A A communicating with the boiler space and arranged in pairs between the grate surface and the flues, in combination with an air delivery grating mounted upon said water pipes and provided with shoulders *e* adapted to lie between the pairs of supporting water pipes, substantially as and for the purpose set forth.

2. The clay pipes through which the air is delivered mounted upon water pipes arranged in successive pairs so as to provide vertical spaces between the air pipes, said air pipes having their upper surfaces inclined to permit the fall of ashes, and provided with shoulders *e* to prevent lateral displacement, substantially as described.

3. The water pipes A, A communicating with the water space, and arranged in separate sets or couplets, as described, to furnish supports for the series of air distributing pipes, and to secure vertical spaces for the draft and products of combustion, as hereinbefore set forth.

4. The combination in a steam boiler furnace, of a set of water pipes arranged in the fire box above the fire and having communication at both ends with the water space of the boiler, two layers of detachable fire brick having cavities in their adjacent faces and supported upon the water pipes, and a set of perforated air pipes arranged between the two layers of fire brick, substantially as shown and described.

5. The combination in a furnace, of the supporting water pipes A, the two layers of fire brick H G having central opening *c* and seats or recesses for the air pipes upon each side of said opening, and the air pipes I perforated on each side, and arranged between the layers of fire brick on each side of the opening, substantially as shown and described.

6. The combination in a furnace, of the supporting water pipes A, the two layers of fire brick H G having central opening *c*, shoulders *e*, and cavities or recesses in their adjacent faces, and the perforated air pipes I arranged between the fire brick on each side of the central opening, substantially as shown and described.

7. The combination with a locomotive furnace; of an air feeding device consisting of funnels and pipes arranged to create a forced draft by the motion of the locomotive, and a compound air and steam injector valve arranged in the pipe that leads the air to the furnace, the said air and steam valve being connected together and arranged to automatically operate in an alternate manner, the opening of the air valve from the motion of the locomotive serving to close the steam valve, and the steam valve being arranged to open and the air valve to close when the locomotive stands still, substantially as shown and described.

8. The air feeding device consisting of a pipe having a funnel at its forward end, a casing P with lip *e* and opening *o*, the air valve M having lip *v*, the steam pipes N with injector nozzle *w* and butterfly valve *m*, and crank arm *n* weight *r*, and link *t* connecting the steam valve to the air valve for alternate action, substantially as shown and described.

In testimony whereof I affix my signature in presence of two witnesses.

JNO. MILTON.

Witnesses:
JOHN J. WILMARTH,
N. CURTIS LAMMOND.